(12) United States Patent
Reesink et al.

(10) Patent No.: US 9,238,592 B2
(45) Date of Patent: Jan. 19, 2016

(54) MAGNETOCALORIC MATERIALS

(75) Inventors: Bernard Hendrik Reesink, Winterswijk-Kotten (NL); Ekkehard Brueck, Delft (NL); Huu Dung Nguyen, Delft (NL); Lian Zhang, The Hague (NL)

(73) Assignee: BASF SE, Ludwigshafen (DE)

( * ) Notice: Subject to any disclaimer, the term of this patent is extended or adjusted under 35 U.S.C. 154(b) by 196 days.

(21) Appl. No.: 12/984,080

(22) Filed: Jan. 4, 2011

(65) Prior Publication Data

US 2011/0167837 A1 Jul. 14, 2011

(30) Foreign Application Priority Data

Jan. 11, 2010 (EP) ..................................... 10150411

(51) Int. Cl.
| | |
|---|---|
| *F25B 21/00* | (2006.01) |
| *C09K 5/00* | (2006.01) |
| *C04B 35/58* | (2006.01) |
| *B22F 3/10* | (2006.01) |
| *C04B 35/515* | (2006.01) |
| *C21D 1/18* | (2006.01) |
| *C21D 9/00* | (2006.01) |

(Continued)

(52) U.S. Cl.
CPC ......... *C04B 35/58085* (2013.01); *B22F 3/1028* (2013.01); *C04B 35/5154* (2013.01); *C21D 1/18* (2013.01); *C21D 9/0068* (2013.01); *C22C 1/00* (2013.01); *C22C 1/02* (2013.01); *C22C 1/04* (2013.01); *C22C 1/0491* (2013.01); *C22C 22/00* (2013.01); *C22C 30/00* (2013.01); *C22C 33/02* (2013.01); *C22C 38/04* (2013.01); *H01F 1/015* (2013.01); *C04B 2235/3272* (2013.01); *C04B 2235/40* (2013.01); *C04B 2235/428* (2013.01); *C04B 2235/6565* (2013.01); *F24J 3/00* (2013.01); *F28F 21/08* (2013.01)

(58) Field of Classification Search
CPC ................... F25B 2321/002; C04B 2235/405; C04B 35/5154; C09K 5/10
USPC .......................................................... 148/300
See application file for complete search history.

(56) References Cited

U.S. PATENT DOCUMENTS

| | | | |
|---|---|---|---|
| 428,057 A | 5/1890 | Tesla | |
| 2004/0250550 A1* | 12/2004 | Bruck et al. | ..................... 62/3.1 |

(Continued)

FOREIGN PATENT DOCUMENTS

| | | | |
|---|---|---|---|
| WO | WO 2004/068512 A1 | 8/2004 | |
| WO | WO 2009/133047 | * 11/2009 | |

(Continued)

OTHER PUBLICATIONS

Ou et al., J. Phys: Condens. Matter, 2006, vol. 18, p. 11577-11584.*

(Continued)

*Primary Examiner* — Jie Yang
*Assistant Examiner* — Xiaowei Su
(74) *Attorney, Agent, or Firm* — Oblon, McClelland, Maier & Neustadt, L.L.P.

(57) ABSTRACT

What are described are magnetocaloric materials of the general formula $$(Mn_xFe_{1-x})_{2+z}P_{1-y}Si_y$$

Figure 1:
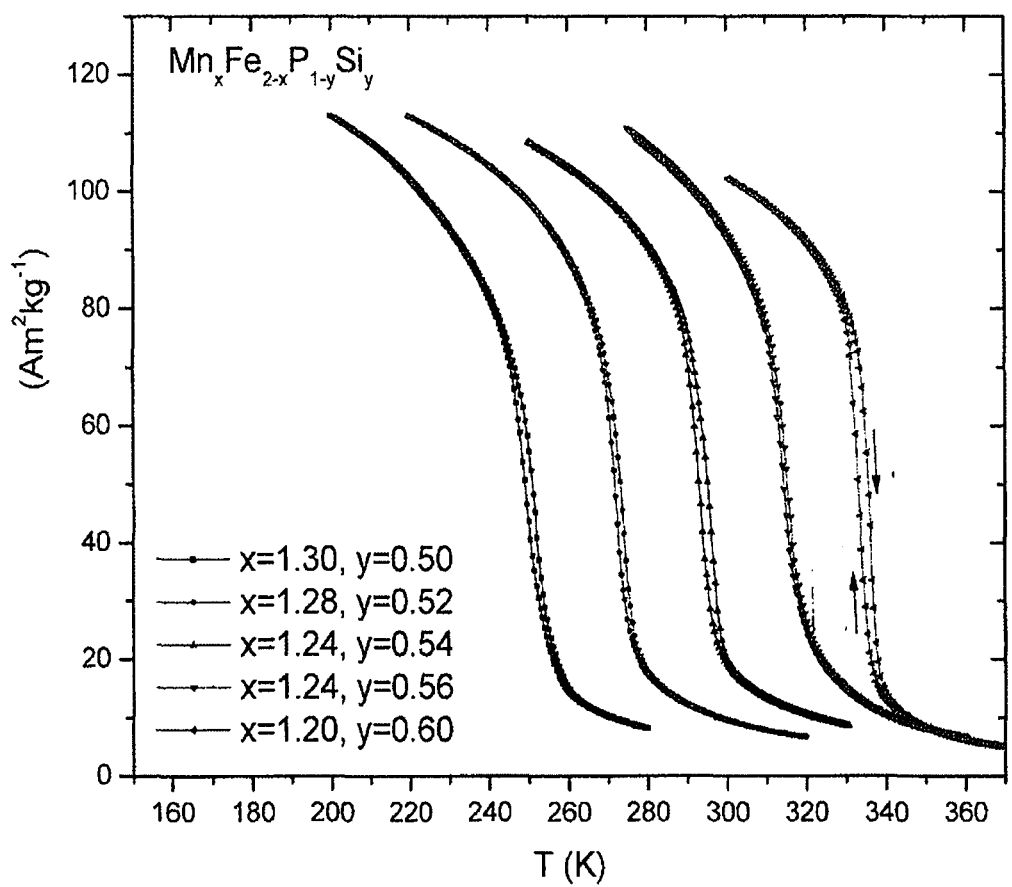

where
$0.55 \leq x < 1$
$0.4 \leq y \leq 0.8$
$-0.1 \leq z \leq 0.1$.

5 Claims, 3 Drawing Sheets

(51) Int. Cl.

| | |
|---|---|
| *C22C 1/00* | (2006.01) |
| *C22C 1/02* | (2006.01) |
| *C22C 1/04* | (2006.01) |
| *C22C 22/00* | (2006.01) |
| *C22C 30/00* | (2006.01) |
| *C22C 33/02* | (2006.01) |
| *C22C 38/04* | (2006.01) |
| *H01F 1/01* | (2006.01) |
| *F24J 3/00* | (2006.01) |
| *F28F 21/08* | (2006.01) |

(56) References Cited

U.S. PATENT DOCUMENTS

| | | |
|---|---|---|
| 2011/0037342 A1 | 2/2011 | Degen et al. |
| 2011/0061775 A1 | 3/2011 | Brueck et al. |

FOREIGN PATENT DOCUMENTS

| | | |
|---|---|---|
| WO | WO 2009/133047 A2 | 11/2009 |
| WO | WO 2009/133049 A1 * | 11/2009 |

OTHER PUBLICATIONS

U.S. Appl. No. 12/990,094, filed Oct. 28, 2010, Degen, et al.
U.S. Appl. No. 12/990,107, filed Oct. 28, 2010, Reesink.
U.S. Appl. No. 12/989,020, filed Oct. 21, 2010, Brueck, et al.
U.S. Appl. No. 12/850,891, filed Aug. 5, 2010, Carroll, et al.
U.S. Appl. No. 12/852,750, filed Aug. 9, 2010, Reesink.
U.S. Appl. No. 12/852,813, filed Aug. 9, 2010, Carroll, et al.
D. T. Cam Thanh, et al., "Magnetocaloric effect in MnFe(P,Si,Ge) compounds", Journal of Applied Physics, vol. 99, 08Q107, 2006, pp. 1-3.
Zhongmin Wang, et al., "Structural stability of single-layered $LaNi_{4.25}Al_{0.75}$ film and its electro-chemical hydrogen-storage properties", Rare Metals, vol. 25, No. 5, Oct. 2006, pp. 543-548.
U.S. Appl. No. 13/044,977, filed Mar. 10, 2011, Brueck, et al.
Office Action issued Sep. 30, 2014 in Japanese Patent Application No. 2012-547582 (with English language translation).
D.T. Cam Thanh, et al., "Structure, magnetism, and magnetocaloric properties of $MnFeP_{1-x}Si_x$ compounds" Journal of Applied Physics, vol. 103, 07B318, 2008, 3 pages.
Shen, et al., "Magnetocaloric Effect of $Mn_{1-35}Fe_{0.65}P_{0.45}Si_{0.55}B_x$ Alloys". Metallic Functional Materials (2014), vol. 21, No. 1, 5-8 (with English translation).

\* cited by examiner

MAGNETOCALORIC MATERIALS

The invention relates to polycrystalline magnetocaloric materials, to processes for their production and to their use in coolers, heat exchangers or generators, in particular refrigerators.

Thermomagnetic materials, also referred to as magnetocaloric materials, can be used for cooling, for example in refrigerators or air conditioning units, in heat pumps or for direct generation of power from heat without intermediate connection of a conversion to mechanical energy.

Such materials are known in principle and are described, for example, in WO 2004/068512. Magnetic cooling techniques are based on the magnetocaloric effect (MCE) and may constitute an alternative to the known vapor circulation cooling methods. In a material which exhibits a magnetocaloric effect, the alignment of randomly aligned magnetic moments by an external magnetic field leads to heating of the material. This heat can be removed from the MCE material to the surrounding atmosphere by a heat transfer. When the magnetic field is then switched off or removed, the magnetic moments revert back to a random arrangement, which leads to cooling of the material below ambient temperature. This effect can be exploited for cooling purposes. Typically, a heat transfer medium such as water is used for heat removal from the magnetocaloric material.

The materials used in thermomagnetic generators are likewise based on the magnetocaloric effect. In a material which exhibits a magnetocaloric effect, the alignment of randomly aligned magnetic moments by an external magnetic field leads to heating of the material. This heat can be released by the MCE material into the surrounding atmosphere by a heat transfer. When the magnetic field is then switched off or removed, the magnetic moments revert back to a random alignment, which leads to cooling of the material below ambient temperature. This effect can be exploited firstly for cooling purposes, and secondly for conversion of heat to electrical energy.

The magnetocaloric generation of electrical energy is associated with magnetic heating and cooling. At the time of first conception, the process for energy generation was described as pyromagnetic energy generation. Compared to devices of the Peltier or Seebeck type, these magnetocaloric devices can have a significantly higher energy efficiency.

The research into this physical phenomenon began in the late 19$^{th}$ century, when two scientists, Tesla and Edison, filed a patent on pyromagnetic generators. In 1984, Kirol described numerous possible applications and conducted thermodynamic analyses thereof. At that time, gadolinium was considered to be a potential material for applications close to room temperature.

A pyromagnetoelectric generator is described, for example, by N. Tesla in U.S. Pat. No. 428,057. It is stated that the magnetic properties of iron or other magnetic substances can be destroyed partially or entirely or can disappear as a result of heating to a particular temperature. In the course of cooling, the magnetic properties are re-established and return to the starting state. This effect can be exploited to generate electrical power. When an electrical conductor is exposed to a varying magnetic field, the changes in the magnetic field lead to the induction of an electrical current in the conductor. When, for example, the magnetic material is surrounded by a coil and is then heated in a permanent magnetic field and then cooled, an electrical current is induced in the coil in the course of heating and cooling in each case. This allows thermal energy to be converted to electrical energy, without an intermediate conversion to mechanical work. In the process described by Tesla, iron, as the magnetic substance, is heated by means of an oven or a closed fireplace and then cooled again.

For the thermomagnetic or magnetocaloric applications, the material should permit efficient heat exchange in order to be able to achieve high efficiencies. Both in the course of cooling and in the course of power generation, the thermomagnetic material is used in a heat exchanger.

WO 2004/068512 discloses magnetocaloric materials of the general formula $MnFe(P_wGe_xSi_z)$. Preferred materials are $MnFeP_{0.45-0.70}Ge_{0.55-0.30}$ or $MnFeP_{0.5-0.7}(Si/Ge)_{0.5-0.3}$. In each case, the example compositions comprise proportions of Ge. These substances still do not have a sufficiently great magnetocaloric effect for all applications.

It is an object of the present invention to provide magnetocaloric materials having a large magnetocaloric effect.

The object is achieved in accordance with the invention by magnetocaloric materials of the general formula

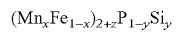

$$(Mn_xFe_{1-x})_{2+z}P_{1-y}Si_y$$

where
  $0.55 \leq x < 1$
  $0.4 \leq y \leq 0.8$
  $-0.1 \leq z \leq 0.1$.

x preferably has a minimum value of 0.57, more preferably of 0.6. The maximum value of x is preferably 0.99, in particular 0.9, especially 0.85. For example, x has a maximum value of 0.8, in particular 0.65. More preferably $0.57 \leq x \leq 0.8$, in particular $0.6 5 \leq x \leq 0.65$.

y preferably has a minimum value of 0.45, more preferably of 0.5, especially of 0.51. The maximum value of y is preferably 0.7, more preferably 0.6. More preferably $0.45 \leq y \leq 0.7$, in particular $0.5 \leq y \leq 0.6$, especially $0.51 \leq y \leq 0.6$.

z may differ from 0 by small values. Preferably $-0.05 \leq z \leq 0.05$, in particular $-0.02 \leq z \leq 0.02$, especially $z=0$.

The inventive magnetocaloric materials preferably have a hexagonal structure of the $Fe_2P$ type.

It has been found in accordance with the invention that especially an Mn/Fe element ratio of more than 1.2 leads to magnetocaloric materials with stabilized phase formation and low thermal hysteresis.

The inventive materials allow a working temperature in application in the range from −50° C. to +100° C.

The magnetocaloric effect of the inventive materials is comparable to the magnetocaloric effect of what are known as giant magnetocaloric materials such as $MnFeP_xAs_{1-x}$, $Gd_5(Si, Ge)_4$ or $La(Fe, Si)_{13}$.

The thermal hysteresis, determined in a magnetic field of 1 T with a sweep rate of 1° C./min, is preferably <2° C.

The inventive materials additionally have the advantage that they are formed from elements which are available in large amounts and are generally classified as nontoxic.

The thermomagnetic materials used in accordance with the invention can be produced in any suitable manner.

The inventive magnetocaloric materials can be produced by solid phase conversion or liquid phase conversion of the starting elements or starting alloys for the material, subsequently cooling, then pressing, sintering and heat treating under inert gas atmosphere and subsequently cooling to room temperature, or by melt spinning of a melt of the starting elements or starting alloys.

The thermomagnetic materials are produced, for example, by solid phase reaction of the starting elements or starting alloys for the material in a ball mill, subsequent pressing, sintering and heat treatment under inert gas atmosphere and subsequent cooling, for example slow cooling, to room temperature. Such a process is described, for example, in J. Appl. Phys. 99, 2006, 08Q107.

For example, suitable amounts of Mn, Fe, P and Si in element form or in the form of preliminary alloys such as $Mn_2P$ or $Fe_2P$ can be ground in a ball mill. The powders are pressed and sintered at temperatures in the range from 900 to 1300° C., preferably of about 1100° C., for a suitable time, preferably 1 to 5 hours, especially about 2 hours, and then heat treated at temperatures in the range from 700 to 1000° C., preferably about 850° C., for suitable periods, for example 1 to 100 hours, more preferably 10 to 30 hours, especially about 20 hours, under a protective gas atmosphere.

Alternatively, the element powders or preliminary alloy powders can be melted together in an induction oven. It is then possible in turn to perform a heat treatment as specified above.

Processing via melt spinning is also possible. This makes possible a more homogeneous element distribution which leads to an improved magnetocaloric effect; cf. Rare Metals, Vol. 25, October 2006, pages 544 to 549. In the process described there, the starting elements are first induction-melted in an argon gas atmosphere and then sprayed in the molten state through a nozzle onto a rotating copper roller. There follows sintering at 1000° C. and slow cooling to room temperature.

In addition, reference may be made to WO 2004/068512 and PCT/EP 2009/055024 for the production.

Preference is therefore given to a process for producing the thermomagnetic materials, comprising the following steps:
a) converting chemical elements and/or alloys in a stoichiometry which corresponds to the magnetocaloric material in the solid and/or liquid phase,
b) optionally converting the reaction product from stage a) to a solid,
c) sintering and/or heat treating the solid from stage a) or b),
d) quenching the sintered and/or heat treated solid from stage c) at a cooling rate of at least 100 K/s.

The thermal hysteresis can be reduced significantly and a large magnetocaloric effect can be achieved when the metal-based materials are not cooled slowing to ambient temperature after the sintering and/or heat treatment, but rather are quenched at a high cooling rate. This cooling rate is at least 100 K/s. The cooling rate is preferably from 100 to 10 000 K/s, more preferably from 200 to 1300 K/s. Especially preferred cooling rates are from 300 to 1000 K/s.

The quenching can be achieved by any suitable cooling processes, for example by quenching the solid with water or aqueous liquids, for example cooled water or ice/water mixtures. The solids can, for example, be allowed to fall into ice-cooled water. It is also possible to quench the solids with subcooled gases such as liquid nitrogen. Further processes for quenching are known to those skilled in the art. What is advantageous here is controlled and rapid cooling.

The rest of the production of the thermomagnetic materials is less critical, provided that the last step comprises the quenching of the sintered and/or heat treated solid at the inventive cooling rate. The process may be applied to the production of any suitable thermomagnetic materials, as described above.

In step (a) of the process, the elements and/or alloys which are present in the later thermomagnetic material are converted in a stoichiometry which corresponds to the thermomagnetic material in the solid or liquid phase.

Preference is given to performing the reaction in stage a) by combined heating of the elements and/or alloys in a closed vessel or in an extruder, or by solid phase reaction in a ball mill. Particular preference is given to performing a solid phase reaction, which is effected especially in a ball mill. Such a reaction is known in principle; cf. the documents cited above. Typically, powders of the individual elements or powders of alloys of two or more of the individual elements which are present in the later thermomagnetic material are mixed in pulverulent form in suitable proportions by weight. If necessary, the mixture can additionally be ground in order to obtain a microcrystalline powder mixture. This powder mixture is preferably heated in a ball mill, which leads to further comminution and also good mixing, and to a solid phase reaction in the powder mixture. Alternatively, the individual elements are mixed as a powder in the selected stoichiometry and then melted.

The combined heating in a closed vessel allows the fixing of volatile elements and control of the stoichiometry. Specifically in the case of use of phosphorus, this would evaporate easily in an open system.

The reaction is followed by sintering and/or heat treatment of the solid, for which one or more intermediate steps can be provided. For example, the solid obtained in stage a) can be subjected to shaping before it is sintered and/or heat treated.

Alternatively, it is possible to send the solid obtained from the ball mill to a melt-spinning process. Melt-spinning processes are known per se and are described, for example, in Rare Metals, Vol. 25, October 2006, pages 544 to 549, and also in WO 2004/068512 and PCT/EP 2009/055024.

In these processes, the composition obtained in stage a) is melted and sprayed onto a rotating cold metal roller. This spraying can be achieved by means of elevated pressure upstream of the spray nozzle or reduced pressure downstream of the spray nozzle. Typically, a rotating copper drum or roller is used, which can additionally be cooled if appropriate. The copper drum preferably rotates at a surface speed of from 10 to 40 m/s, especially from 20 to 30 m/s. On the copper drum, the liquid composition is cooled at a rate of preferably from $10^2$ to $10^7$ K/s, more preferably at a rate of at least $10^4$ K/s, especially with a rate of from 0.5 to $2 \times 10^6$ K/s.

The melt-spinning, like the reaction in stage a) too, can be performed under reduced pressure or under an inert gas atmosphere.

The melt-spinning achieves a high processing rate, since the subsequent sintering and heat treatment can be shortened. Specifically on the industrial scale, the production of the thermomagnetic materials thus becomes significantly more economically viable. Spray-drying also leads to a high processing rate. Particular preference is given to performing melt spinning.

Alternatively, in stage b), spray cooling can be carried out, in which a melt of the composition from stage a) is sprayed into a spray tower. The spray tower may, for example, additionally be cooled. In spray towers, cooling rates in the range from $10^3$ to $10^5$ K/s, especially about $10^4$ K/s, are frequently achieved.

The sintering and/or heat treatment of the solid is effected in stage c) as described above.

In the case of use of the melt-spinning process, the period for sintering or heat treatment can be shortened significantly, for example to periods of from 5 minutes to 5 hours, preferably from 10 minutes to 1 hour. Compared to the otherwise customary values of 10 hours for sintering and 50 hours for heat treatment, this results in a major time advantage.

The sintering/heat treatment results in partial melting of the particle boundaries, such that the material is compacted further.

The melting and rapid cooling in stage b) thus allows the duration of stage c) to be reduced considerably. This also allows continuous production of the thermomagnetic materials.

The inventive magnetocaloric materials can be used in any suitable applications. For example, they are used in coolers, heat exchangers or generators. Particular preference is given to use in refrigerators.

The invention is illustrated in detail by examples.

EXAMPLES

Preparation of the Magnetocaloric Materials 15 g of a mixture of Mn flakes, Si flakes and $Fe_2P$ powder with a nominal stoichiometry of $Mn_{1.2}Fe_{0.8}P_{0.4}Si_{0.6}$ were ground in a planetary ball mill with a BPR (ball to powder weight ratio) of 4 for 10 hours. The powder obtained in the grinding was then pressed into cylinder form and sealed in an ampoule under 200 mbar of argon gas. This was followed by a sintering step at 1100° C. for 2 hours and a heat treatment at 850° C. for hours. The sample was removed after the furnace had been cooled down.

Samples with the nominal composition $Mn_{1.24}Fe_{0.76}P_{0.44}Si_{0.56}$, $Mn_{1.24}Fe_{0.76}P_{0.46}Si_{0.54}$, $Mn_{1.28}Fe_{0.72}P_{0.48}Si_{0.52}$ and $Mn_{1.3}Fe_{0.7}P_{0.5}Si_{0.5}$ were prepared in the same way.

Magnetic Properties

The magnetic properties of the samples thus prepared were determined in a Quantum Design MPMSXL SQUID magnetometer.

FIG. 1 shows the temperature dependence of the magnetization ($Am^2kg^{-1}$), determined with a sweep rate of 1 K/min in a magnetic field of 1 T. The temperature dependence between the heating and cooling curves at the transition shows the thermal hysteresis of the first-order magnetic transition for these samples. The value depends on the particular sample, but is always less than 2 K in the samples studied.

In the curves, the curve indicated by the arrow pointing upward relates to the cooling, and the curve indicated by the arrow pointing downward to the heating of the sample. The significant change in magnetization in the region of about 100 $\mu m^2kg^{-1}$ as a result of the sharp magnetic transition shows a large magnetocaloric effect.

Figure 2:
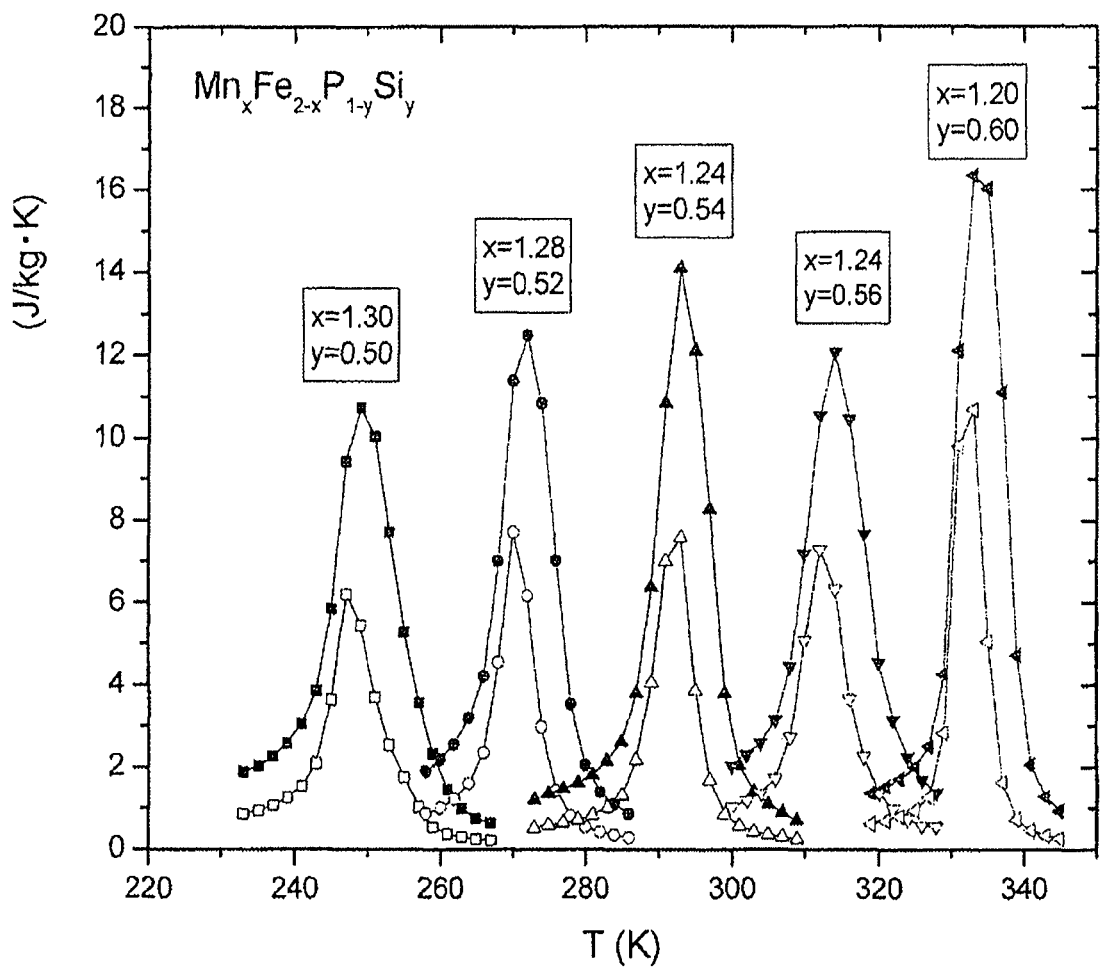

FIG. 2 shows the change in magnetic entropy (J/kg K) as a function of temperature for these samples. The change in magnetic entropy was derived from the magnetic isotherms (see, for example, FIG. 3), measured at different temperatures close to the transition, using the Maxwell equation. The values obtained for the change in magnetic entropy are comparable to corresponding values for the so-called GMCEs (giant magnetocaloric effect materials).

The unfilled symbols relate to a field change of 0-1 T. The filled symbols represent a field change for 0-2 T.

Figure 3:
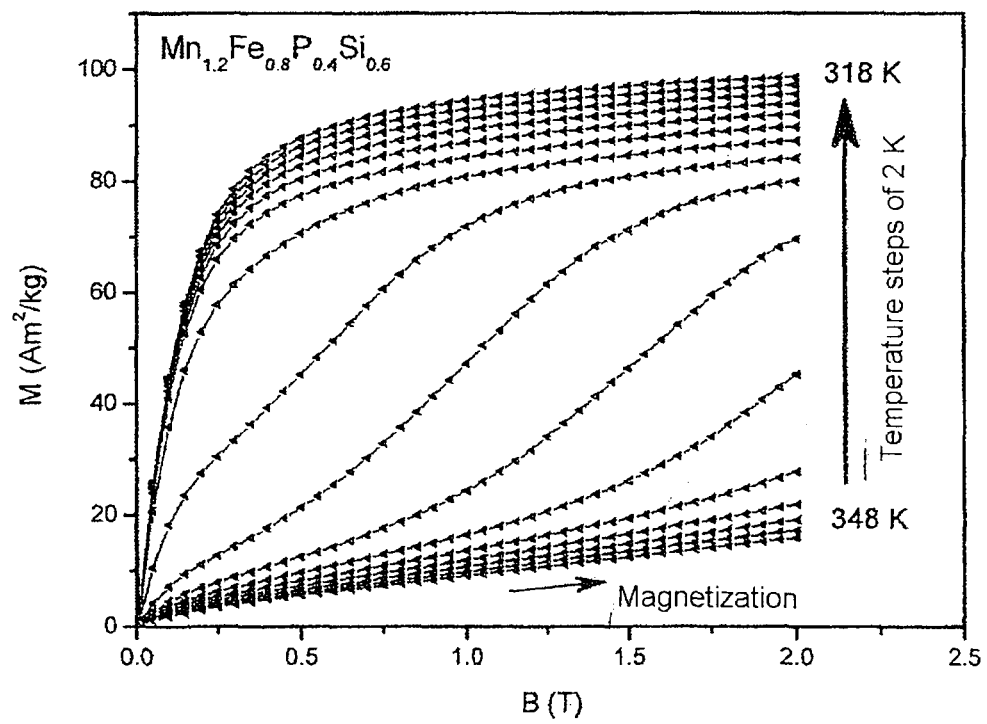

FIG. 3 shows the magnetic isotherms ($Am^2/kg$) of $Mn_{1.2}Fe_{0.8}P_{0.4}Si_{0.6}$ close to the magnetic transition.

The invention claimed is:

1. A magnetocaloric material of formula (1):

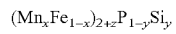

(1)

where
0.6≤x≤0.65
0.45≤y≤0.6
−0.05≤z≤0.05.

2. The magnetocaloric material according to claim 1, which has a hexagonal structure of the $Fe_2P$ type.

3. A process for producing the magnetocaloric material according to claim 1, said process comprising:
performing solid phase conversion or liquid phase conversion of Mn, Fe, P and Si to a material of formula (1), wherein the Mn, Fe, P and Si are in element form or alloy form,
optionally cooling the material of formula (1),
and then
a) pressing, sintering and heat treating under inert gas atmosphere and subsequently cooling to room temperature the optionally cooled material of formula (1), or
b) melt spinning of a melt of the optionally cooled material of formula (1).

4. A process for producing the magnetocaloric material according to claim 1, comprising:
a) converting Mn, Fe, P and Si to a material of formula (1), wherein the Mn, Fe, P and Si are in element form or alloy form, and wherein the material of formula (1) is in the solid and/or liquid phase,
b) if the material of formula (1) from a) is in the liquid phase, converting said material in the liquid phase to a solid phase,
c) sintering and/or heat treating the material of formula (1) in the solid phase from a) or b),
d) quenching the sintered and/or heat treated material of formula (1) in the solid phase from c) at a cooling rate of at least 100 K/s.

5. A cooler, a heat exchanger or a generator, comprising the magnetocaloric material according to claim 1.

* * * * *